(12) United States Patent
Herron

(10) Patent No.: US 6,902,672 B2
(45) Date of Patent: Jun. 7, 2005

(54) OPEN-CHANNELED SPIRAL-WOUND MEMBRANE MODULE

(75) Inventor: Jack Herron, Corvallis, OR (US)

(73) Assignee: Osmotek, Inc., Albany, OR (US)

( * ) Notice: Subject to any disclaimer, the term of this patent is extended or adjusted under 35 U.S.C. 154(b) by 0 days.

(21) Appl. No.: 10/752,238

(22) Filed: Jan. 5, 2004

(65) Prior Publication Data

US 2004/0226876 A1 Nov. 18, 2004

Related U.S. Application Data

(62) Division of application No. 09/688,612, filed on Oct. 15, 2000, now Pat. No. 6,673,242.

(51) Int. Cl.$^7$ .............................................. B01D 63/00
(52) U.S. Cl. ............................ 210/321.74; 210/321.83; 210/497.4; 156/184; 156/187; 264/DIG. 48; 264/285; 264/339
(58) Field of Search .......................... 210/321.74, 321, 210/83, 493, 4; 264/DIG. 48, 285, 339; 156/184, 187

(56) References Cited

U.S. PATENT DOCUMENTS

| | | | | |
|---|---|---|---|---|
| 4,476,022 A | * | 10/1984 | Doll | 210/321.83 |
| 4,735,717 A | * | 4/1988 | Sims | 210/247 |
| 4,802,982 A | * | 2/1989 | Lien | 210/247 |
| 4,834,881 A | * | 5/1989 | Sawada et al. | 210/321.74 |
| 4,842,736 A | * | 6/1989 | Bray et al. | 210/321.61 |
| 4,902,417 A | * | 2/1990 | Lien | 210/321.74 |
| 4,906,372 A | * | 3/1990 | Hopkins | 210/321.74 |
| 4,944,877 A | * | 7/1990 | Maples | 210/321.74 |
| 5,137,637 A | * | 8/1992 | Korin | 210/634 |
| 5,186,832 A | * | 2/1993 | Mancusi et al. | 210/321.8 |
| 5,264,171 A | * | 11/1993 | Prasad et al. | 264/103 |
| 5,352,361 A | * | 10/1994 | Prasad et al. | 210/321.81 |
| 5,538,642 A | * | 7/1996 | Solie | 210/652 |
| 5,858,229 A | * | 1/1999 | Uemura et al. | 210/321.75 |
| 5,985,146 A | * | 11/1999 | Knappe et al. | 210/321.83 |
| 6,168,648 B1 | * | 1/2001 | Ootani et al. | 95/46 |
| 6,190,557 B1 | * | 2/2001 | Hisada et al. | 210/650 |
| 6,673,242 B1 | * | 1/2004 | Herron | 210/321.74 |
| 6,755,970 B1 | * | 6/2004 | Knappe et al. | 210/321.68 |

* cited by examiner

*Primary Examiner*—Ana Fortuna
(74) *Attorney, Agent, or Firm*—Jeffrey B. Oster

(57) ABSTRACT

There is disclosed a spiral-wound membrane module design for various membrane filtration techniques having significantly reduced fluid flow resistance in the feed stream path. Specifically, the inventive spiral-wound membrane module is designed having a corrugated entrance and exit spacers together over less than 10% of the length of the spiral wound module and a stiffener sheet wound to provide for uniform feed channel gap width.

11 Claims, 5 Drawing Sheets

ENDVIEW CLOSE-UP

OPEN-CHANNELED SPIRAL-WOUND MEMBRANE MODULE

This is a Provisional of application Ser. No. 09/688,612, filed Oct. 15, 2000, now U.S. Pat. No. 6,673,242.

TECHNICAL FIELD OF THE INVENTION

The present invention provides a spiral-wound membrane module design for various membrane filtration techniques having significantly reduced fluid flow resistance in the feed stream path. Specifically, the inventive spiral-wound membrane module is designed having a corrugated entrance and exit spacers together over less than 10% of the length of the spiral wound module and a stiffener sheet wound to provide for uniform feed channel gap width.

BACKGROUND OF THE INVENTION

In the field of pressure-driven membrane separations (e.g., ultrafiltration, reverse osmosis, nanofiltration) there is frequently a problem of membrane fouling from contamination of other dissolved and suspended solids in feed streams. This kind of membrane separation has been used, for example, in apple juice clarification, waste water treatment, cheese whey desalting, potable water production, oil-water emulsion separation, etc.). This problem has been addressed in a variety of ways. For feed streams that are not fouling, hollow fiber membrane module are most efficient and cost effective means of separation. However, hollow fiber membrane designs will foul most easily and cannot be used for the majority of feed streams in industrial processing or waste treatment due to fouling problems.

The next most expensive membrane design in terms of providing the greatest membrane surface area in a vessel per cost is a spiral wound configuration. In a spiral wound configuration, a permeate spacer, a feed spacer and two membranes are wrapped around a perforated tube and glued in place. The membranes are wound between the feed spacer and the permeate spacer. Feed fluid is forced to flow longitudinally through the module through the feed spacer, and fluid passing through the membranes flows inward in a spiral through the permeate spacer to the center tube. To prevent feed fluid from entering the permeate spacer, the two membranes are glued to each other along their edges with the permeate spacer captured between them. The feed spacer remains unglued. A diagram of a cross-section of three wraps of a standard module is shown in FIG. 1. Module assemblies are wound up to a desired diameter and the outsides are sealed. In operation, multiple modules are placed in a tubular housing and fluid is pumped through them in series. The center tubes are plumbed together to allow removal of generated permeate.

Spiral wound membrane designs have been used successfully but can also foul with higher fouling feed streams. The fouling problem in standard spiral wound membranes is often due to the nature of the feed spacer that is required to be located through each of the feed channels. In addition, the presence of the feed spacer creates significant resistance to fluid flow. A typical feed spacer is a polymeric porous net-like material that the feed must be forced through in the longitudinal direction (i.e., the length) of the spiral wound membrane. Therefore, spiral wound membrane designs can also have fouling problems in the feed spacer and membrane and incur significant fluid dynamic problems due to resistance of the feed spacer. However, spiral wound designs are less expensive than alternatives for only less-fouling feed streams.

For the most fouling feed streams (for examples, solutions containing high levels of suspended solids or tend to form gels upon concentration) a tubular design membrane module has been designed. A tubular design provides the least amount of membrane surface area per module length, and is most expensive to manufacture due to labor intensive procedures for "potting" the tubular membranes within a module. Moreover, the inlet and outlet chambers associated with tubular designs are also most expensive. Therefore, there is a need in the art to replace the tubular design with a less expensive design and still be able to process highly fouling feed streams. The present invention was made to replace the tubular design with a spiral wound design for those feed streams that could not otherwise be processed (economically) in standard membrane modules having feed spacer designs.

SUMMARY OF THE INVENTION

The present invention provides a spiral wound membrane module having a length and a radius and a circular cross section, having reduced fluid flow resistance, comprising:

(a) an envelope sandwich having a width equal to the length of the membrane module and comprising a layer of membrane next to a layer of permeate spacer material next to a stiffener means, next to a layer of permeate spacer material next to a layer of membrane, and wherein the envelope sandwich is wrapped increasing the radius of the membrane module; and (b) a structural assembly located between each wrap of the envelope sandwich to provide an open path for each feed chamber throughout the length of the membrane module.

Preferably, the stiffener means is composed of a hard shell sheet or an extruded or calendered rib. Most preferably, a rib stiffener means run in the same direction as permeate flow and provide permeate channels. Preferably, the structural assembly extends no more than 10% of the length of the membrane module. Preferably, the structural assembly is located at both ends of the membrane module. Preferably, the membrane module further comprises a perforated or porous tube extended throughout the length of the membrane module and located axially around a cylinder axis of the membrane module. Most preferably, the perforated or porous tube is used to collect permeate.

Preferably, the stiffener in the form of a sheet is made from a rigid sheet having a thickness of from about 0.1 mm to about 3 mm, most preferably from about 0.5 mm to about 1 mm. Preferably, the stiffener in the form of a sheet is made from a rigid material selected from the group consisting of PVC (polyvinyl chloride), C-PVC (chlorinated polyvinyl chloride) polypropylene, polyethylene, acrylic, stainless steel, copper, tin, and aluminum. Most preferably, the stiffener sheet is polyethylene for food uses or PVC for non-food uses, or C-PVC for high temperature uses. Preferably, the structural assembly is a corrugated pattern ribbon. Preferably, the structural assembly is a rigid material, wherein the rigid material is selected from the group consisting of polyethylene, stainless steel, aluminum, acrylic, and polycarbonate.

The present invention further provides a process for making a spiral wound membrane module having a length and a radius and a circular cross section, having reduced fluid flow resistance, comprising (a) assembling an envelope sandwich having a width equal to the length of the membrane module and comprising a layer of membrane next to a layer of permeate spacer material next to a layer of stiffener means next to a layer of permeate spacer material next to a layer of membrane, and wherein the envelope sandwich is wrapped increasing the radius of the membrane module;

(b) assembling a structural assembly on either end of the envelope sandwich; and (c) wrapping the envelope sandwich having the structural assembly and glue to form the spiral wound membrane module.

Preferably, the stiffener means is composed of a hard shell sheet or an extruded or calendered rib. Most preferably, a rib stiffener means run in the same direction as permeate flow and provide permeate channels. Preferably, the process further comprises before step (c) adding glue to either end of the envelope sandwich. Preferably, the structural assembly extends no more than 10% of the length of the membrane module. Preferably, the membrane module further comprises a perforated or porous tube extending throughout the length of the membrane module and located axially around a cylinder axis of the membrane module and upon which the sandwich assembly is wrapped.

Preferably, the stiffener in the form of a sheet is made from a rigid sheet having a thickness of from about 0.1 mm to about 3 mm, most preferably from about 0.5 mm to about 1 mm. Preferably, the stiffener in the form of a sheet is made from a rigid material selected from the group consisting of PVC (polyvinyl chloride), C-PVC (chlorinated polyvinyl chloride) polypropylene, polyethylene, acrylic, stainless steel, copper, tin, and aluminum. Most preferably, the stiffener sheet is polyethylene for food uses or PVC for non-food uses, or C-PVC for high temperature uses. Preferably, the structural assembly is a corrugated pattern ribbon. Preferably, the structural assembly is a rigid material, wherein the rigid material is selected from the group consisting of polyethylene, stainless steel, aluminum, acrylic, and polycarbonate.

DETAILED DESCRIPTION OF THE INVENTION

Figure 1:
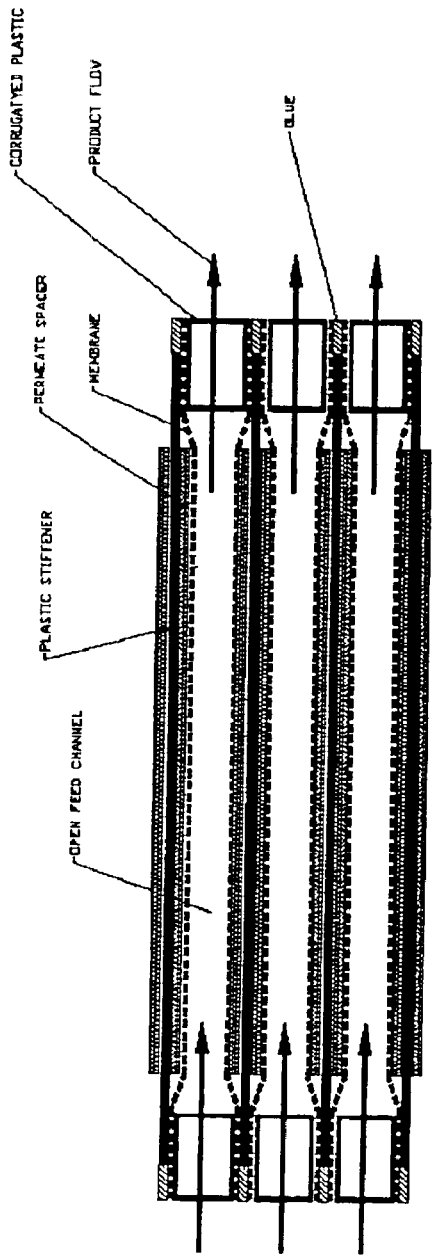
FIG. 1 shows a prior art cut away in an axial direction showing product flow direction (through the length of a module) through a feed chamber having feed spacer (cross hatched) material contained within the entire area of the feed chamber. In addition, there is permeate spacer located throughout the permeate chamber. In addition, the membrane is shown along with glue on the outer edges to maintain the integrity of the permeate chamber.

The present invention provides an improved membrane design for spiral wound membranes that provide the cost advantages and space savings of spiral wound with superior flux and fouling characteristics. The advantage of a spiral wound membrane design prior to the present invention is that it is inexpensive and has high membrane density (~30 $m^2$ per 20 cm diameter by 100 cm long element). Its drawback is that it is highly susceptible to fouling since the feed must flow longitudinally through a net-like feed spacer. The fibers of the feed spacer allow suspended solids to become lodged and blind the membrane, degrading performance and inhibiting cleaning. Pressure drops are also high in the flow through the feed spacer, which makes it impossible to achieve the fluid velocities that have been shown to provide the best performance of membranes.

Another membrane module design in common usage is the "tubular" design. In this design, the fluid is pumped at high velocity down the center of a tubular membrane (5 mm to 30 mm in diameter), and the fluid permeating the membrane is contained by an exterior housing. Often multiple tubes are bundled in a single housing. This design has the advantage that the flow path is unobstructed, allowing very high-solids fluids to be filtered. The disadvantage of this design is its high cost and low membrane density. Thus, there is a need to combine the expense and density advantages of spiral wound with flow path advantages of tubular. The present invention has achieved this.

Module Design

The invention is a spiral module design that does not require a feed spacer, thus providing the advantages of unobstructed feed channels, at far lower cost than tubular modules. Instead, the inventive membrane is a spiral wound design but without traditional spacer materials. Specifically, the present invention provides a spiral wound membrane module having a length and a radius and a circular cross section, having reduced fluid flow resistance, comprising (a) an envelope sandwich having a width equal to the length of the membrane module and comprising a layer of membrane next to a layer of permeate spacer material next to a layer of stiffener sheet next to a layer of permeate spacer material next to a layer of membrane, and wherein the envelope sandwich is wrapped increasing the radius of the membrane module; and (b) a structural assembly located between each wrap of the envelope sandwich to provide an open path for each feed chamber throughout the length of the membrane module.

Essentially, the inventive membrane provides a "layered" approach to a spiral wound design with a stiff backing material and no spacer material through most of the flow path. The layered membrane sandwich is shown in a cutaway view of three channels in FIG. 2 wherein the sandwich layer for the middle section of the spiral wound module forms a membrane (green) on a permeate spacer material (red), on a polymeric stiffener material (dark blue), permeate spacer material (red), and another membrane (green). Thus, the membrane is always between the permeate channel kept open by conventional spacer technology and a larger feed channel kept open by the polymeric stiffener (though the larger middle section of the module) and without conventional spacer technology. Thus, the vast majority of the feed channel is open to significantly improve the flow rates and pressure drips, especially for high suspended solids feed streams (e.g., landfill leachate).

Figure 2:
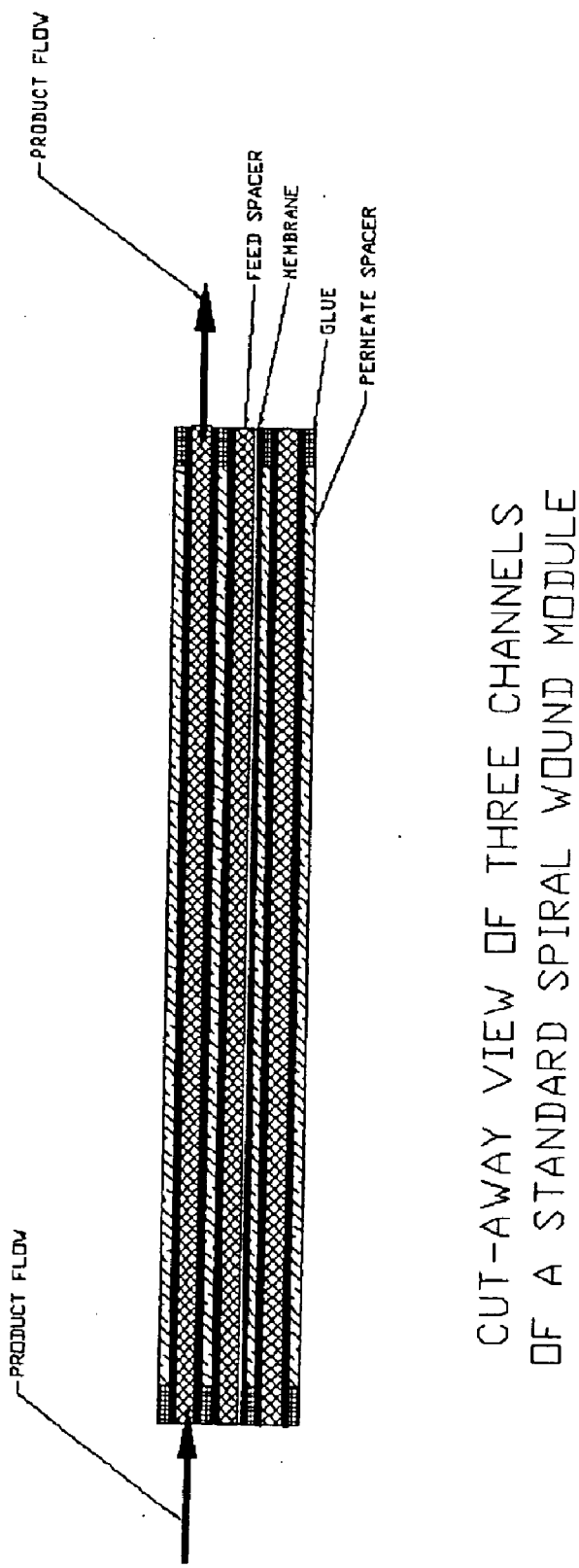
FIG. 2 shows a cut away in the axial direction of the inventive spiral-wound membrane module design showing the novel open feed channels having a stiffener sheet between membrane layers. There is also a glued plug at either end, similar to the prior art design to form the permeate chamber. In addition there is a corrugated feed chamber spreader at either end to provide for a uniform feed chamber gap maintainer.
Figure 3:
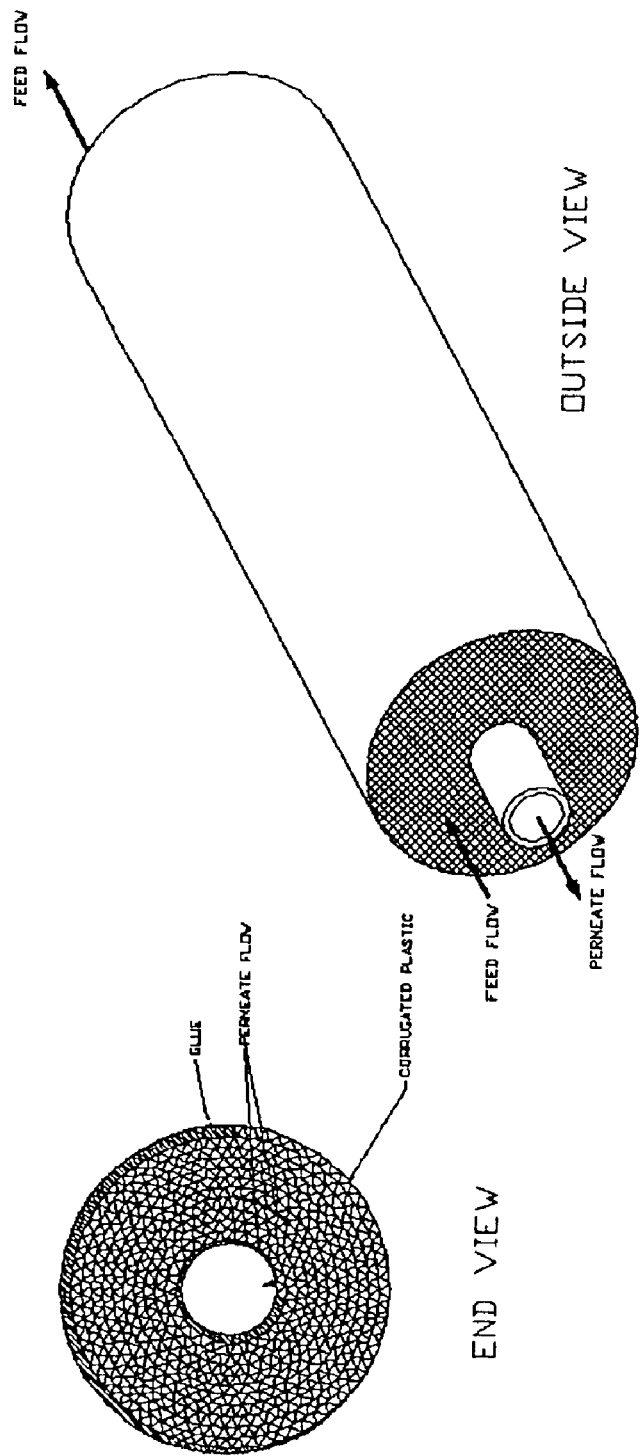
FIG. 3 shows an outside view of the inventive spiral wound membrane module showing standard flow characteristics of feed and permeate. The end view shows the corrugated feed chamber spreader at the end.
Figure 4:
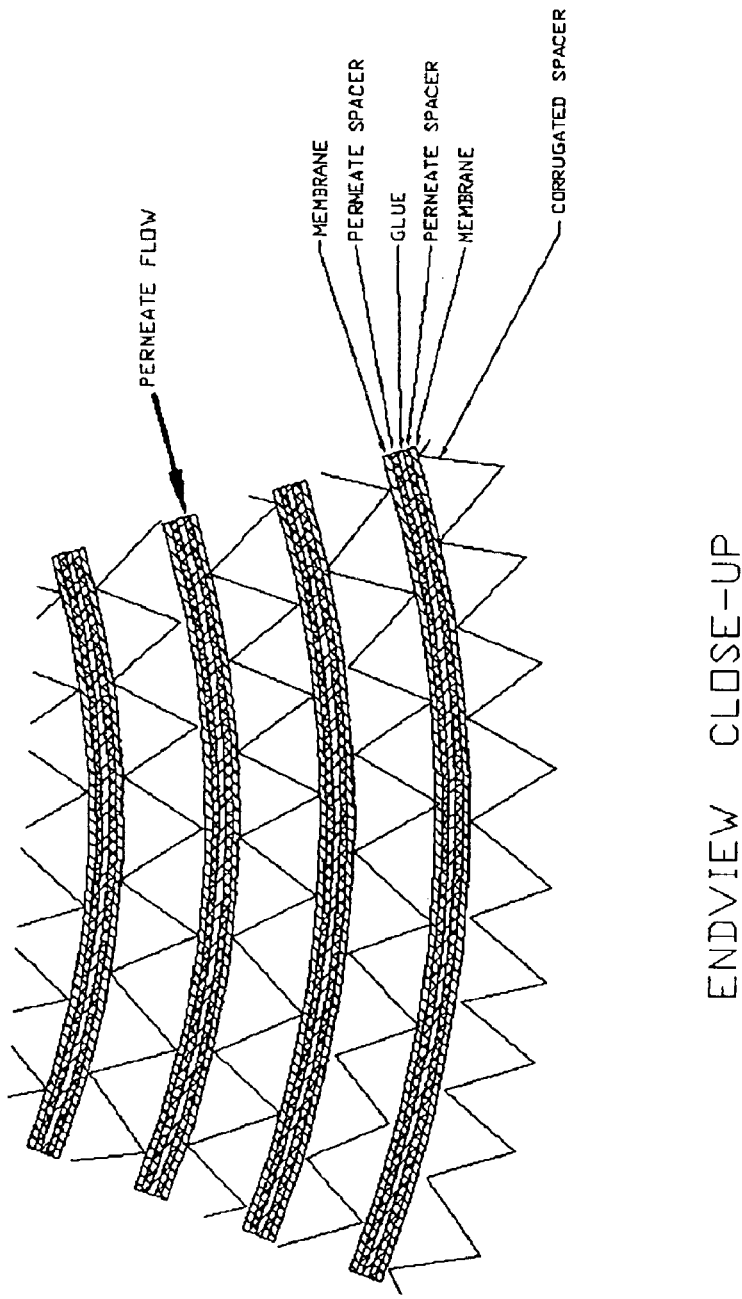
FIG. 4 shows an end view close up again illustrating the corrugated feed chamber spreader and each layer having a membrane, permeate spacer, glue, permeate spacer and membrane.
Figure 5:
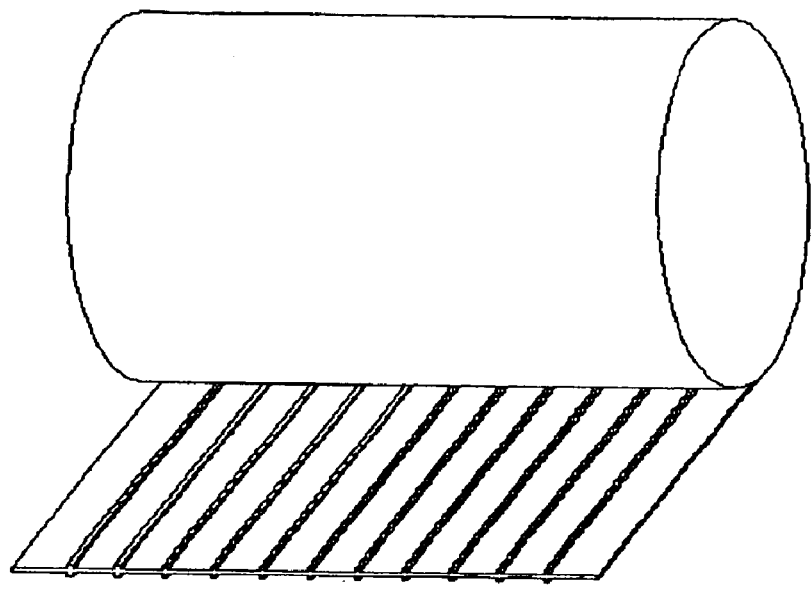
FIG. 5 shows an embodiment of the inventive spiral wound membrane module having ribs as the stiffener means.

Further with reference to FIG. 2, either end of the module has a feed channel spacer to align the polymeric stiffener sandwich to have open feed channels, preferably a corrugated plastic material as shown in FIG. 2 and as a "corrugated spacer" in FIG. 4, and glue (FIG. 2, light blue) to anchor the polymeric stiffener sandwich component and provide for permeate to be channeled to the center of the spiral wound module.

Therefore, the inventive spiral wound module is designed in a similar fashion to a typical spiral wound membrane module except that there is no feed chamber spacer at all through most of the middle segment of the module (i.e., 90%+ of the length) and the feed chamber remains patent with superior flow characteristics and pressure drops. This inventive design is illustrated in FIGS. 2–5. The design is similar to a standard spiral wound design, except it requires no feed spacer. In a standard spiral wound module the feed spacer material fills the entire feed channel. In the inventive design, by contrast, a thick, corrugated spacer is used only at the front and back edge of the feed channel. Fluid pressure then keeps the membranes in contact with the permeate spacer and keeps the feed channels unobstructed. A uniform feed channel width is ensured by employing a plastic stiffener in the permeate channel. The stiffener is typically 0.5 mm to 1 mm thick and made from PVC, polypropylene, or polyethylene. To provide for permeate flow on both sides of the stiffener, two permeate spacers are used with the stiffener between them. As in the standard spiral wound design, the membranes are glued along the edges, capturing the permeate spacers and stiffener.

Ultrafiltration modules with the inventive design have been made and tested for performance criteria. Specifically, 24 cm diameter by 60 cm long element with a feed channel gap width of 3 mm had a pressure drop of 1 kPa when feed fluid velocities inside the module were 0.5 m/sec. The module contained an effective membrane area of 10 m². To put these data into perspective, the pressure drop experienced is about ten-fold lower than a conventional spiral wound device of about the same area and size having a conventional feed chamber spacer.

The inventive membrane module design can be applied to a variety of applications ranging from microfiltration through ultrafiltration to reverse osmosis. Initial tests of the fouling resistance of the membrane have been conducted by ultrafiltration of a heavily soiled, machine shop cutting fluid containing emulsified oil. At 75% water removal, 0.5 m/sec cross-flow velocity, and 300 kpa pressure, the membrane flux declined less than 20% in 100 hours of operation without any cleanings. A similar membrane in a traditional spiral wound membrane module would foul and a much higher rate.

I claim:

1. A process fro making a spiral wound membrane module having a length and a radius and a circular cross section, having reduced fluid flow resistance, comprising a) assembling an envelope sandwich having a width equal to the length of the membrane module and comprising a layer of membrane next to a layer of permeate spacer material next to a layer of stiffener sheet next to a layer of permeate spacer material next to a layer of membrane, and wherein the envelope sandwich is wrapped increasing the ratio of the membrane module;

b) a structural assembly located between each wrap of the envelope sandwich, extending no more than 30% of the length of the membrane module, to provide an open path for each feed chamber throughout the length of the membrane module; and c) wrapping the envelope sandwich having the structural assembly and glue to form the spiral wound membrane module.

2. The process for making a spiral wound membrane module of claim 1 wherein the stiffener means is composed of a hard shell sheet or an extruded or calendered rib.

3. The process for making a spiral wound membrane module of claim 2 wherein the rib stiffener means runs in the same direction as permeate flow and provide permeate channels.

4. The process for making a spiral wound membrane module of claim 2 wherein the stiffener sheet is made from a rigid sheet having a thickness of from about 0.1 mm to about 3 mm, most preferably from about 0.5 mm to about 1 mm.

5. The process for making a spiral wound membrane module of claim 2 wherein the stiffener sheet is made from a rigid material selected from the group consisting of PVC (polyvinyl chloride), C-PVC (chlorinated polyvinyl chloride) polypropylene, polyethylene, acrylic, stainless steel, copper, tin, and aluminum.

6. The process for making a spiral wound membrane module of claim 5 wherein the stiffener sheet is polyethylene for food uses or PVC for non-food uses, or C-PVC for high temperature uses.

7. The process for making a spiral wound membrane module of claim 1 wherein the process further comprises before step (c) adding glue to either end of the envelope sandwich.

8. The process for making a spiral wound membrane module of claim 1 wherein the structural assembly extends no more than 10% of the length of the membrane module.

9. The process for making a spiral wound membrane module of claim 1 wherein the membrane module further comprises a perforated or porous tube extending throughout the length of the membrane module and located axially around a cylinder axis of the membrane module and upon which the sandwich assembly is wrapped.

10. The process for making a spiral wound membrane module of claim 1 wherein the structural assembly is a corrugated pattern ribbon.

11. The process for making a spiral wound membrane module of claim 1 wherein the structural assembly is a rigid material, wherein the rigid material is selected from the group consisting of polyethylene, stainless steel, aluminum, acrylic, and polycarbonate.

* * * * *